(12) United States Patent
Appleton

(10) Patent No.: US 9,334,944 B2
(45) Date of Patent: May 10, 2016

(54) PULLEY ASSEMBLY FOR BELT DRIVE

(71) Applicant: Deere & Company, Moline, IL (US)

(72) Inventor: Andy B. Appleton, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 60 days.

(21) Appl. No.: 14/452,126

(22) Filed: Aug. 5, 2014

(65) Prior Publication Data

US 2016/0040772 A1 Feb. 11, 2016

(51) Int. Cl.
 *F16H 55/00* (2006.01)
 *F16H 9/10* (2006.01)
 *F16H 55/54* (2006.01)

(52) U.S. Cl.
 CPC ..................... *F16H 55/54* (2013.01)

(58) Field of Classification Search
 CPC .......... F16H 9/10; F16H 55/54; F16H 55/24; B65H 49/30; B65H 75/242
 USPC ................................. 474/47, 54, 55
 See application file for complete search history.

(56) References Cited

U.S. PATENT DOCUMENTS

| | | | | |
|---|---|---|---|---|
| 157,150 A * | 11/1874 | Brand | ...................... | F16H 55/54 474/54 |
| 234,876 A * | 11/1880 | Jones | ........................ | F16H 9/10 474/55 |
| 692,474 A * | 2/1902 | Pope | .................... | B65H 75/242 242/573.2 |
| 889,902 A * | 6/1908 | Campbell et al. | ........ | F16H 55/54 474/54 |
| 895,298 A * | 8/1908 | Pope | ....................... | B65H 49/30 242/574.3 |
| 1,198,451 A * | 9/1916 | Juarez | ..................... | F16H 55/54 474/54 |
| 1,446,294 A * | 2/1923 | Healey | ...................... | F16H 9/10 474/53 |
| 1,523,241 A * | 1/1925 | Backman | .................. | F16H 9/10 474/53 |
| 1,574,441 A * | 2/1926 | Putnam | ................... | D01G 27/00 19/151 |
| 1,626,240 A * | 4/1927 | Kosken | ..................... | F16H 55/24 474/131 |
| 2,266,538 A * | 12/1941 | Evans | ..................... | D05B 35/06 112/152 |
| 2,552,179 A * | 5/1951 | Kamp | ....................... | F16H 9/10 474/53 |
| 2,645,946 A * | 7/1953 | Schleif | ...................... | F16H 9/10 474/55 |
| 2,697,360 A * | 12/1954 | Sampietro | ................. | F16H 9/10 474/51 |
| 4,498,351 A * | 2/1985 | Ahoor | ...................... | F16H 9/10 474/47 |
| 7,951,027 B2 * | 5/2011 | An | ........................... | F16H 9/10 474/47 |

* cited by examiner

*Primary Examiner* — Henry Liu

(57) ABSTRACT

A variable-speed belt drive pulley assembly includes a plurality of pulley segments, a plurality of sliders, and a rotatable hub. Each segment is adapted to engage a drive belt and is mounted to an outer end of a corresponding slider which is slidably received by the hub. Each slider may be a pair of rods extending from the body in parallel relationship to each other. The hub has a plurality of bores. Each bore slidably receives a corresponding one of the rods. An actuator device moves the segments radially inwardly and outwardly with respect to the hub. A coil spring is mounted on each the rods, and is biased to urge one of the segments radially outwardly.

14 Claims, 3 Drawing Sheets

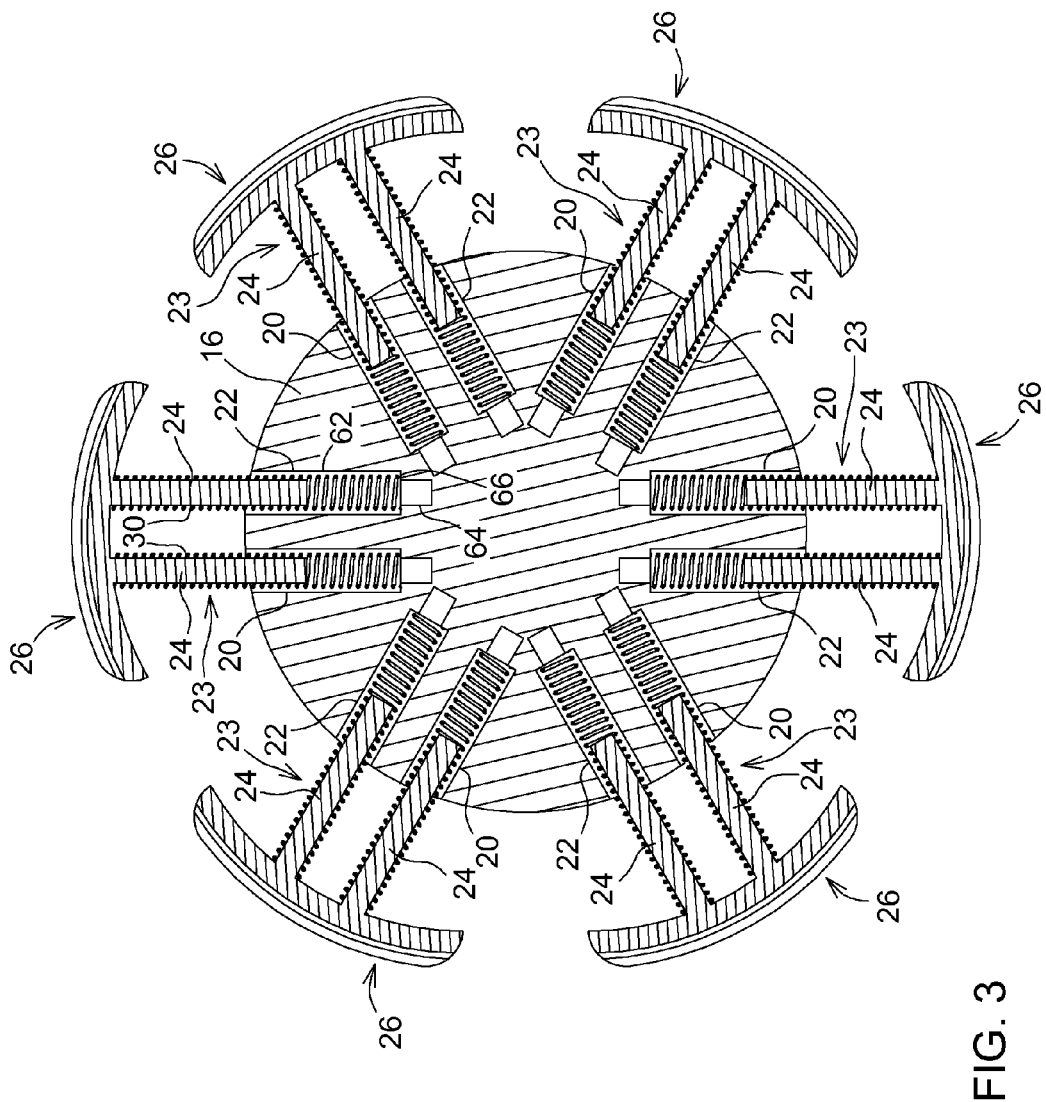

PULLEY ASSEMBLY FOR BELT DRIVE

FIELD

The present disclosure relates to a pulley assembly for a belt drive.

BACKGROUND

Known variable speed drive units include hydrostatic drives, viscous drives, toroidal drives, and Vari-Cool™ and similar variable sheave drives. Variable sheave designs use the side of the belt and axial force to affect different speed ratios. The axial force pinches the belt which must be physically pulled out from the sheave pair. Certain belt drive power transmissions use a ribbed belt which has lengthwise grooves and which engages a pulley with grooves. Typically, the pulleys in such a rib-belt drive have a fixed radius, and thus, have a fixed ratio between the radius of the driving pulley and the radius of the driven pulley. It is desired to provide a variable radius pulley for such a ribbed belt drive which has the efficiency of a typical poly-rib belt drive.

SUMMARY

According to an aspect of the present disclosure, a variable-speed belt drive pulley assembly includes a shaft, a rotatable hub, a plurality of pulley segments, a plurality of sliders and an actuator. Each segment is adapted to engage a drive belt. The segments are moveable via a four-bar linkage. More bars or alternative four-bar elements could be used but the preferred embodiment includes two sliders and a link affixed to a ground element. Each segment has a curved body attached an outer end of a corresponding slider. Each slider is slidably received by the hub. The shaft is the ground member of the four-bar linkage.

Each slider may comprise a pair of rods extending from the body in parallel relationship to each other. The hub has a plurality of bores. Each bore extends inwardly from an outer surface of the hub, and each bore slidably receives a corresponding one of the rods. The plurality of bores form sets of bores which are parallel to each other and which are spaced apart on opposite sides of a line which extends radially outwardly from a central axis of the hub.

The assembly also includes a plurality of resilient members or coil springs. Each spring is mounted to a corresponding one of the rods, and each spring is biased to urge one of the segments radially outwardly. Each bore includes a larger diameter portion and a smaller diameter portion joined together by an annular shoulder. Each shoulder engages an end of a corresponding one of the springs.

An actuator device moves the segments inwardly and outwardly with respect to the hub. The actuator device includes a sleeve which is slidably mounted on the shaft, and a plurality of arms coupled to the sleeve. Each arm has an inner end pivotally coupled to the sleeve and has an outer end pivotally coupled to a corresponding one of the segments. The sleeve forms the second slider in the preferred four-bar embodiment. Each arm forms the link in the four-bar linkage.

This drive pulley assembly can be used in a variable drive for a vehicle to match fan speed with cooling requirements. This design relies on predominantly radial force to create the friction required between belt and pulley to be able to transmit force which is turned into shaft torque.

BRIEF DESCRIPTION OF THE DRAWINGS

FIG. 3 is a view taken along lines 3-3 of FIG. 2.

DETAILED DESCRIPTION OF THE DRAWINGS

Figure 1:
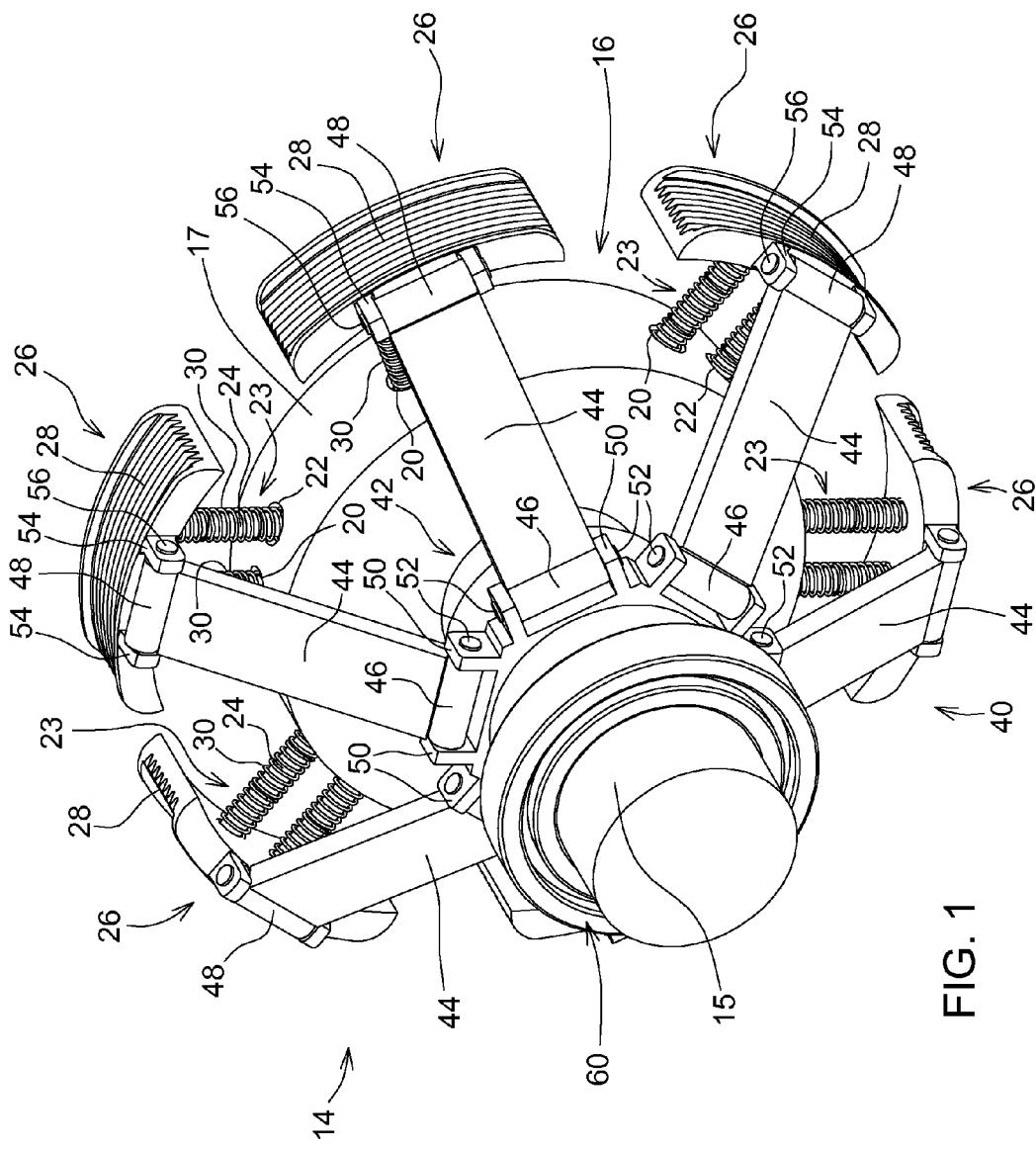
FIG. 1 is a perspective view of a belt drive assembly embodying the invention.
Figure 2:
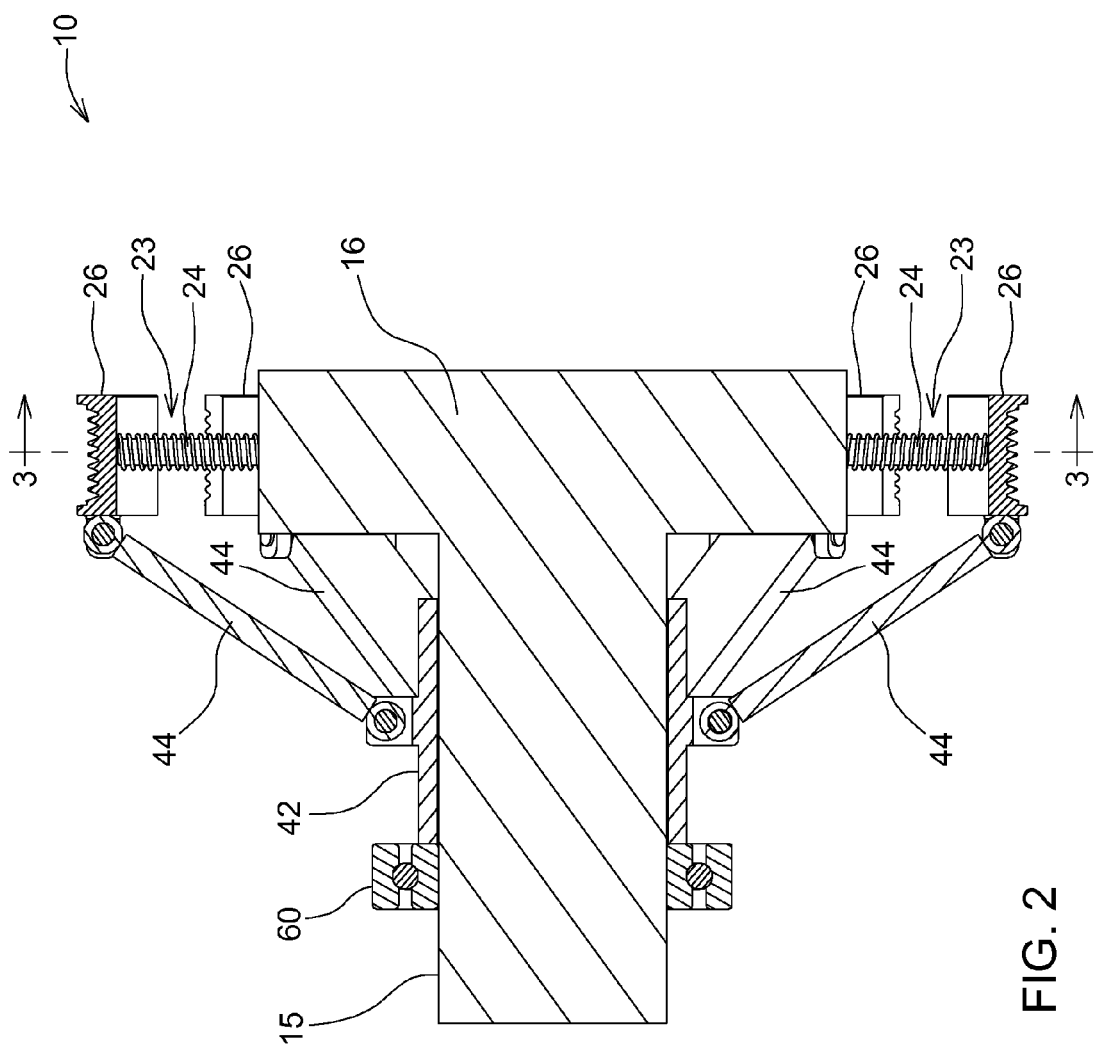
FIG. 2 is a sectional view of the belt drive assembly of FIG. 1.

Referring to FIGS. 1 and 2, a variable-speed belt drive assembly 10 includes a drive unit 14. The drive unit 14 includes a hub 16 mounted to a shaft 15. The hub 16 includes a plurality of sets 18 of bores 20 and 22. Within each bore set 18, bores 20 and 22 are parallel to each other, as best seen in FIG. 3. Each bore 20 and 22 extends inwardly into the hub 16 from the outer surface 17 of the hub 16.

The assembly 10 also includes a plurality of slider devices 23 and a plurality of pulley segments 26. Each segment 26 is mounted on the outer end of a slider device 23 which slidably received by the hub 16. The slider device 23 may include two or more rods 24. Each rod 24 is slidably received in a corresponding one of the bores 20, 22. Each segment 26 has a curved outer surface 28 which engages a belt (not shown) which is preferably a poly-rib belt. The rods 24 and segments 26 rotate with the hub 16. The rods 24 slide in the bores 20, 22 so that the segments 26 are radially movable with respect to the hub 16. Alternatively, the slider device 23 may be a generally rectangular bar (not shown) which slidably received in a corresponding slot (not shown) formed in the hub 16.

The assembly 10 also includes a plurality of resilient members or coil springs 30. Each resilient member 30 is mounted to a corresponding one of the rods 24. Each resilient member 30 is biased to urge one of the segments 26 radially outwardly with respect to the hub 16. Each resilient member 30 is preferably a coil spring which surrounds one of the rods 24. The resilient members 30 spring load the segments 26 to keep the sheave segments expanded and in contact with the belt (not shown).

The assembly 10 also includes an actuator device 40 for moving the segments 26 radially inwardly and outwardly with respect to the hub 16. The actuator device 40 includes a hollow sleeve 42 and a plurality of arms 44. The sleeve 42 is slidably mounted on the shaft 15. Each arm 44 has an inner end 46 pivotally coupled to the sleeve 42 and having an outer end 48 pivotally coupled to a corresponding one of the segments 26. The sleeve 42 has tabs 50 which project outwardly from the sleeve 42. Pairs of the tabs 50 support pivot pins 52. The inner end 46 of each of the arms 44 is pivotally supported by one of the pins 52. Similarly, each segment 26 has a pair of tabs 54 which support pivot pins 56. The outer end 48 of each of the arms 44 is pivotally supported by one of the pins 56. As the sleeve 42 slides towards the hub 16, the arms 44 pivot and move the segments 26 radially outwardly. As the sleeve 42 slides away from the hub 16, the arms 44 pivot and move the segments 26 radially inwardly. The length of element 44 as coupled to segment 26 and sleeve 42 is designed in a manner whereby rods 24 cannot escape bores 20, 22 should the poly-rib belt break during operation, yet the mechanism can be assembled and disassembled via insertion and removal of pins 52 and 56.

The actuator 40 device maintains the segments 26 in synchronization and in a certain radial position to define a speed ratio with another pulley unit (not shown).

The assembly 10 also includes a hollow bearing 60 slidably mounted on the shaft 15 adjacent to the sleeve 42. The bearing 60 is engagable with a non-rotating actuator (not shown) which moves the sleeve 42 axially on the shaft 15. The actuator (not shown) may be a hydraulic actuator, air cylinders, a ramp mechanism or other linear actuator. The actuator could be similar to transmission clutch throw-out bearing axial movement device (not shown). The actuator (not shown) could also include screw-pitch members (not shown) whereby rotation could cause the sleeve 42 to move axially, or the actuator could act directly on the arms 44 or the segments 26. Alternatively, actuation could be accomplished by balanced weighting and spring forces between drive units wherein increase rotation speed with subsequent centripetal forces drive actuation of the unit.

As best seen in FIG. 3, each bore 20 and 22 includes a larger diameter outer portion 62 and a smaller diameter inner portion 64. Portions 62 and 64 are joined together by an outwardly facing annular shoulder 66. Each shoulder engages an end of a corresponding one of the springs 30. Also, as best seen in FIG. 3, the bores 20 and 22 form parallel sets of bores, wherein bore 20 and 22 are parallel to each other and are spaced apart on opposite sides of a line L which extends radially outwardly from a central axis A of the hub 16.

The result is a pulley assembly for a poly-rib belt pulley which has a plurality of pulley segments. These segments are then moved radially away from a central axis of the pulley hub to change the affective pulley diameter. Two or more adjustable pulleys assemblies may be used in a system (not shown) to affect a variable ratio between driver(s) and driven shafts. This pulley assembly may be used in a fan drive, or the pulley assembly may be used for any drive requiring variable speed.

With this pulley assembly, a belt tensioner (not shown) may not be needed if the spring mechanisms can provide the required system dampening. The drive unit 14 preferably has 6 pulley segments 26, and could be a driven unit driven by a driver pulley unit (not shown) having a different number such as five, pulley segments (not shown). Each drive unit may have the same or different effective diameter. Having a combination of drive units with different numbers of pulley segments can help reduce possible vibration harmonics, as is known in powertrain design. When segments are radially extended, the effective diameter of the mechanism between segments may be slightly smaller than the segment itself. To overcome small fluctuations in speed due to this varied diameter, a damper (not shown) could be used to smooth torsional oscillation, and could be integrated into the assembly connection points of the driver, driven or both.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. A variable-speed belt drive pulley assembly, the assembly comprising:
   a rotatable hub;
   a plurality of pulley segments, each segment having a curved body adapted to engage a drive belt;
   a plurality of sliders, each slider having an outer end attached to a corresponding one of the segments, and each slider having an inner end slidably received by the hub, each slider comprising at least two rods extending from the body in parallel relationship to each other, the hub having a plurality of bores, each bore extending generally inwardly from an outer surface of the hub, each bore slidably receiving a corresponding one of the rods;
   an actuator device for moving the segments inwardly and outwardly with respect to the hub; and
   a plurality of resilient members, each resilient member being mounted to a corresponding one of the rods, each resilient member being biased to urge one of the segments outwardly.

2. The drive pulley assembly of claim 1, wherein:
   each resilient member comprises a coil spring surrounding one of the rods.

3. The drive pulley assembly of claim 1, wherein:
   the hub is mounted to a shaft;
   a sleeve is slidably mounted on the shaft; and
   a plurality of arms are coupled to the sleeve, each arm having an inner end pivotally coupled to the sleeve and having an outer end pivotally coupled to a corresponding one of the segments.

4. The drive pulley assembly of claim 1, wherein:
   the plurality of bores form sets of bores which are parallel to each other and which are spaced apart on opposite sides of a line which extends radially outwardly from a central axis of the hub.

5. The drive pulley assembly of claim 1, wherein:
   each bore includes a larger diameter portion and a smaller diameter portion which are joined together by an annular shoulder, each shoulder engaging an end of a corresponding one of the resilient members.

6. The drive pulley assembly of claim 1, wherein:
   the hub forms a ground member of a four-bar mechanism.

7. A variable-speed belt drive pulley assembly, the assembly comprising:
   a plurality of pulley segments, each segment being adapted to engage a drive belt, each segment having a curved body and a pair of rods extending from the body in parallel relationship to each other;
   a rotatable hub, the hub having a plurality of bores, each bore extending inwardly from an outer surface of the hub, each bore slidably receiving a corresponding one of the rods;
   an actuator device for moving the segments inwardly and outwardly with respect to the hub; and
   a plurality of resilient members, each resilient member biased to urge one of the segments radially outwardly.

8. The drive pulley assembly of claim 7, wherein:
   the plurality of bores form sets of bores which are parallel to each other and which are spaced apart on opposite sides of a line which extends radially outwardly from a central axis of the hub.

9. The belt drive assembly of claim 7, wherein:
   each bore extends inwardly into the hub from an outer surface of the hub.

10. The drive pulley assembly of claim 7, further comprising:
    a plurality of resilient members, each resilient member being mounted to a corresponding one of the rods, each resilient member being biased to urge one of the segments radially outwardly.

11. The drive pulley assembly of claim 10, wherein:
    each bore includes a larger diameter portion and a smaller diameter portion joined together by an annular shoulder, each shoulder engaging an end of a corresponding one of the resilient members.

12. The drive pulley assembly of claim 7, wherein:
    the hub is mounted to a shaft;
    a sleeve is slidably mounted on the shaft; and a plurality of arms are coupled to the sleeve, each arm having an inner end pivotally coupled to the sleeve and having an outer end pivotally coupled to a corresponding one of the segments.

13. The drive pulley assembly of claim 7, wherein:
each bore includes a larger diameter portion and a smaller diameter portion joined together by an annular shoulder, each shoulder engaging an end of a corresponding one of the resilient members.

14. A variable-speed belt drive pulley assembly, the assembly comprising:
a plurality of pulley segments, each segment being adapted to engage a drive belt, each segment having a curved body and a rod extending from the body;
a rotatable hub, the hub having a plurality of bores, each bore extending inwardly from an outer surface of the hub, each bore slidably receiving a corresponding one of the rods;
an actuator device for moving the segments inwardly and outwardly with respect to the hub; and
a plurality of resilient members, each resilient member biased to urge one of the segments radially outwardly.

\* \* \* \* \*